United States Patent
Pandey et al.

(10) Patent No.: US 11,699,318 B2
(45) Date of Patent: Jul. 11, 2023

(54) METHODS, APPARATUSES, AND SYSTEMS FOR DYNAMICALLY MANAGING ASSETS

(71) Applicant: Intermec IP Corp., Everett, WA (US)

(72) Inventors: Pankaj Kumar Pandey, Charlotte, NC (US); Sridhar Ravilla, Charlotte, NC (US)

(73) Assignee: INTERMEC IP CORP., Everett, WA (US)

( * ) Notice: Subject to any disclaimer, the term of this patent is extended or adjusted under 35 U.S.C. 154(b) by 0 days.

(21) Appl. No.: 17/448,291

(22) Filed: Sep. 21, 2021

(65) Prior Publication Data

US 2022/0398887 A1    Dec. 15, 2022

(30) Foreign Application Priority Data

Jun. 14, 2021  (IN) .............................. 202111026384

(51) Int. Cl.
  *G07C 9/29*    (2020.01)
  *G06K 7/10*    (2006.01)
  *G06K 19/07*   (2006.01)
(52) U.S. Cl.
  CPC ........... *G07C 9/29* (2020.01); *G06K 7/10366* (2013.01); *G06K 19/0723* (2013.01)
(58) Field of Classification Search
  CPC ... G07C 9/29; G06K 7/10366; G06K 19/0723
  USPC ....................................................... 235/451
  See application file for complete search history.

(56) References Cited

U.S. PATENT DOCUMENTS

| | | | |
|---|---|---|---|
| 2008/0297442 A1* | 12/2008 | Gelbman | G09F 9/372 345/55 |
| 2012/0055985 A1* | 3/2012 | Allen | G06Q 10/087 235/375 |
| 2013/0194097 A1 | 8/2013 | Joseph | |
| 2014/0125800 A1* | 5/2014 | Van Nest | G07G 3/003 340/572.3 |
| 2016/0140820 A1* | 5/2016 | Joseph | G08B 13/2417 340/572.1 |
| 2018/0262891 A1 | 9/2018 | Wu et al. | |

(Continued)

FOREIGN PATENT DOCUMENTS

WO    2017/031217 A1    2/2017

OTHER PUBLICATIONS

European search report dated Mar. 9, 2022 for EP Application No. 21198695.

*Primary Examiner* — Ahshik Kim
(74) *Attorney, Agent, or Firm* — Alston & Bird LLP

(57) ABSTRACT

Apparatuses, methods and systems for unlocking a tracking apparatus that is affixed to an asset are disclosed herein. In one example, a method of unlocking a tracking apparatus that is affixed to an asset is provided. The tracking apparatus may comprise an electronic tag electronically coupled to a securing component comprising an actuating element. The method may comprise: receiving asset information associated with the tracking apparatus; generating and storing a secure machine-readable code in conjunction with the asset information; in response to receiving a request to unlock the tracking apparatus, determining whether a received input corresponds with the stored secure machine-readable code; and providing an indication to cause an electronic reader in electronic communication with the tracking apparatus to trigger deactivating the actuating element.

20 Claims, 8 Drawing Sheets

(56) References Cited

U.S. PATENT DOCUMENTS

2021/0104138 A1* 4/2021 Soto ................... G08B 13/2417
2021/0142631 A1* 5/2021 Bella .................. G08B 13/2448
2022/0230040 A1* 7/2022 Bergman ......... G06K 19/07773

* cited by examiner

METHODS, APPARATUSES, AND SYSTEMS FOR DYNAMICALLY MANAGING ASSETS

CROSS-REFERENCE TO RELATED APPLICATIONS

This application claims priority pursuant to 35 U.S.C. 119(a) to Indian Patent Application No. 202111026384, filed Jun. 14, 2021, which application is incorporated herein by reference in its entirety.

BACKGROUND

Various methods, devices and systems such as paper-based technologies may be utilized for tracking assets (e.g., baggage, packages, objects) in different environments (e.g., airports, warehouses or the like). Such methods, devices and systems are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems for dynamically managing assets.

In accordance with various examples of the present disclosure, a method of unlocking a tracking apparatus that is affixed to an asset is provided. The tracking apparatus may comprise an electronic tag electronically coupled to a securing component having an actuating element. The method may comprise receiving asset information associated with the tracking apparatus; generating and storing a secure machine-readable code in conjunction with the asset information; in response to receiving a request to unlock the tracking apparatus, determining whether a received input corresponds with the stored secure machine-readable code; and providing an indication to cause an electronic reader in electronic communication with the tracking apparatus to trigger deactivating the actuating element.

In accordance with various examples of the present disclosure, a method of locking a tracking apparatus that is affixed to an asset is provided. The tracking apparatus may comprise an electronic tag electronically coupled to a securing component having an actuating element. The method may comprise, in response to receiving a request to lock the tracking apparatus, determining whether a received input corresponds with a stored secure machine-readable code; and providing an indication to cause an electronic reader in electronic communication with the tracking apparatus to trigger activating the actuating element.

In accordance with various examples of the present disclosure, an apparatus is provided. The apparatus may comprise an electronic tag; a securing component configured to affix the tracking apparatus to an asset, the securing component having an actuating element; and a display element configured to display asset information, wherein the tracking apparatus is configured to, in response to receive an indication from an electronic reader in electronic communication with the electronic tag, provide a control indication to trigger deactivating the actuating element.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
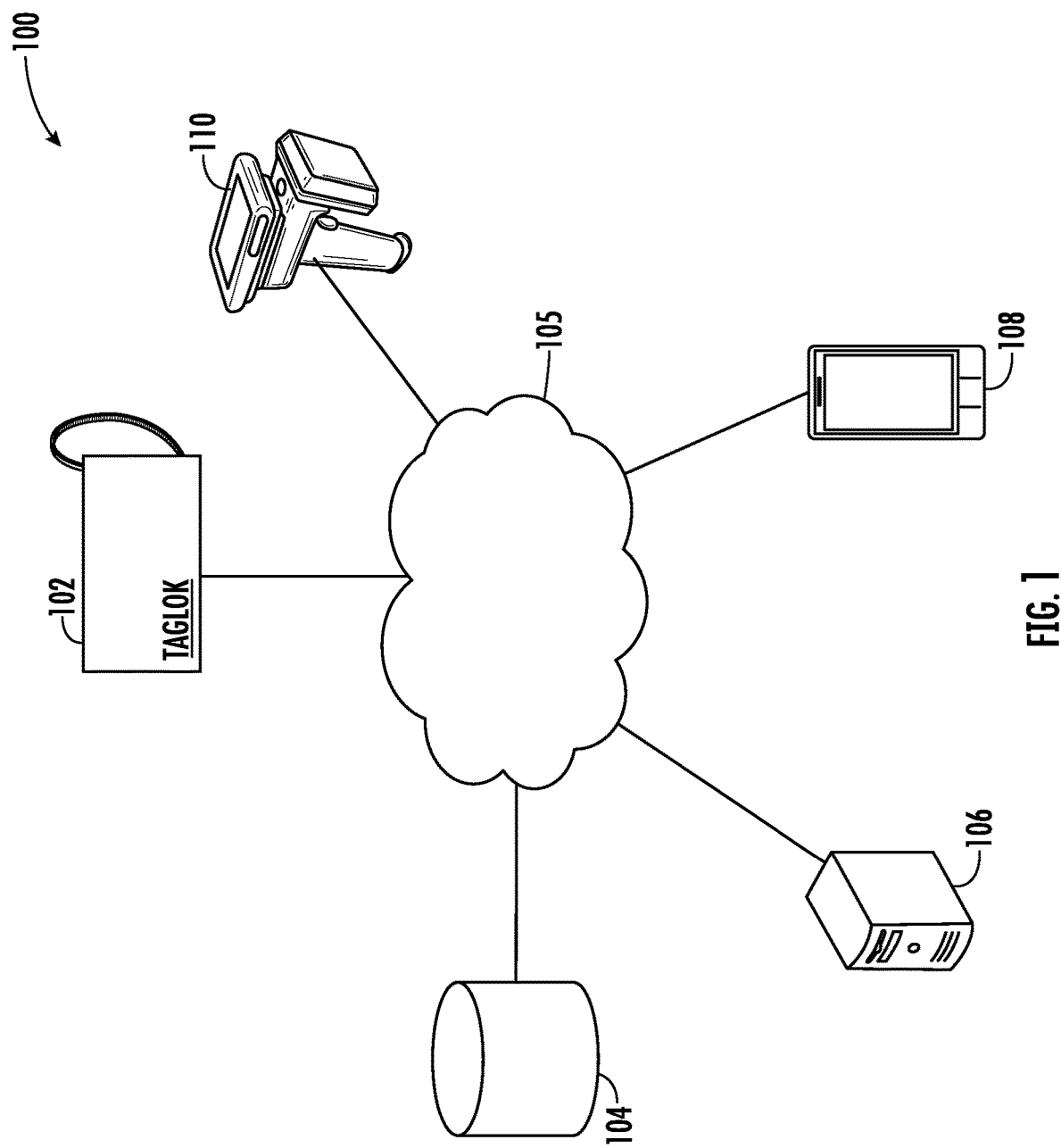
FIG. 1 illustrates an example system in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "electronically coupled" or "in electronic communication with" in the present disclosure may refer to two or more electrical elements (for example, but not limited to, an example processing circuitry, communication element, input/output module memory) and/or electric circuit(s) being connected through wired means (for example but not limited to, conductive wires, system bus, wired Ethernet connection or traces) and/or wireless means (for example but not limited to, wireless network, electromagnetic field, Wi-Fi, Bluetooth, Zigbee), such that data and/or information (for example, electronic indications, signals) may be transmitted to and/or received from the electrical elements and/or electric circuit(s) that are electronically coupled.

The term "antenna element" in the present disclosure may refer to a device or apparatus (e.g., an active element) that may be configured to generate radio frequency (RF) signals when a voltage signal is applied at the antenna element. For example, the antenna element may be configured to generate RF signal in a high frequency (HF) band, ultra-high frequency (UHF) band and/or any other frequency band(s) In some examples, the antenna element may further comprise a matching circuit that, for example, is electronically coupled to the active element to generate the RF signals.

The term "radio frequency identification (RFID) tag" or "electronic tag" in the present disclosure may refer to an article, device, or apparatus comprising, e.g., an integrated circuit (IC), an antenna element, and/or a substrate. In some examples, the antenna element and the IC may be fabricated on the substrate. In some example, the IC may be communicatively coupled to the antenna element through an interconnect on the substrate. In an example embodiment, the IC in the electronic tag may be configured to store encoded information or encoded data. In some examples the electronic tag (e.g., RFID tag) may be configured to operate in one or more RF frequency bands such as, but not limited to, 3 MHz-30 MHz (the HF band (for example, 13.56 MHz)) and/or 860 MHz-960 MHz (the UHF band). In some embodiments, the electronic tag (e.g., RFID tag) may have a dedicated power source that may enable the electronic tag (e.g., RFID tag) to communicate with one or more components (e.g., active electronic tag(s)). In some embodiments, the example electronic tag (e.g., RFID tag) may not have a dedicated power source (e.g., passive electronic tag(s)). In such embodiments, the electronic tag (e.g., RFID tag) may comprise a power coupler that is capable of inducing an electrical charge when the electronic tag (e.g., RFID tag) is within a predetermined range of an RF field. The induced electrical charge may thereafter be used to power the electronic tag (e.g., RFID tag) itself.

An example RFID system may include one or more electronic readers (e.g., RFID readers). The one or more electronic readers (e.g., RFID readers) may be configured to read one or more electronic tags (e.g., RFID tags) affixed to one or more assets. Further, the one or more electronic readers (e.g., RFID readers) may be configured to transmit data, obtained from the one or more electronic tags (e.g., RFID tags), to another computing entity (e.g., a computing entity such as a central server) periodically or in response to receiving a request. To facilitate the transmission of data to another computing entity (e.g., central server), the one or more electronic readers (e.g., RFID readers) may be communicatively coupled to the central server through a backbone network such as, but not limited to, a wireless network, an Ethernet network, and/or the like. In various embodiments, the electronic reader (e.g., RFID readers) may be or comprise handheld devices, portable or mobile devices, stationary devices (e.g., fixedly attached to one or more surfaces within a given environment) or combinations thereof.

In many examples, such as material handling applications, assets (e.g., baggage, parcels, packages, boxes and/or the like) may be conveyed from one location to another location. In one example, a baggage may be deposited at a check-in desk at an airport and conveyed through the facility and unto a flight to a second location where it may be collected from a carousel. In some examples, a paper tag or electronic tag may be affixed to an asset (e.g., baggage) in order to provide asset information to handlers and agents while the asset is being conveyed/transferred through a facility. An example paper tag may include a passenger name, flight information, destination information and/or the like. However, in many cases, paper tags and electronic tags are inadequate for providing real-time information about the location of an asset. For example, such solutions may not be configured to update the information provided (e.g., via the paper tag or electronic tag) while the asset is in transit within an environment. Accordingly, assets are often misplaced while being conveyed/transferred and/or may be improperly routed. By way of example, a passenger or agent may inadvertently collect the wrong asset (e.g., belonging to another passenger or intended for a different destination) from a pick-up point. In another example, a human agent may accidentally route a particular asset to an incorrect destination plane even in an instance in which the asset information displayed on the paper tag or electronic tag is correct. This may result in operational inefficiencies that require additional time and resources to reroute assets within systems. In another example, human agents may be tasked with verifying that an asset is being collected by the right passenger/agent. However, these efforts may be time consuming and inefficient.

In accordance with various embodiments of the present disclosure, example methods, apparatuses, computer program products and systems are provided.

In some examples, a method of unlocking a tracking apparatus that is affixed to an asset is provided. The tracking apparatus may comprise an electronic tag electronically coupled to a securing component having an actuating element. The method may comprise receiving asset information associated with the tracking apparatus; generating and storing a secure machine-readable code in conjunction with the asset information; in response to receiving a request to unlock the tracking apparatus, determining whether a received input corresponds with the stored secure machine-readable code; and providing an indication to cause an electronic reader in electronic communication with the tracking apparatus to trigger deactivating the actuating element. In some examples, the electronic tag comprises a passive radio-frequency identification (RFID) tag, and wherein the electronic reader comprises an RFID reader. In some examples, the method of claim 2, wherein the passive RFID tag comprises an EM4325 integrated circuit (IC) utilizing EPC global Class 1 Generation 2 (EPC C1G2) protocol. In some examples, the method of claim 1, wherein the tracking apparatus further comprises a display element, and wherein the tracking apparatus is configured to display at least a portion of the asset information via the display element. In some examples, the display element comprises an electronic ink display. In some examples, the tracking apparatus further comprises a power harvesting element configured to store energy obtained from the RFID reader for operations of the tracking apparatus. In some examples, the input is provided via a mobile application executing on a user computing entity. In some examples, the actuating element comprises a solenoid actuator operatively coupled to a locking mechanism. In some examples, the secure machine-readable code comprises a one-time password (OTP) or QR code or pass-key or any other type of secure code. In some examples, the method further comprises, subsequent to generating and storing the secure code, transmitting the secure machine-readable code to a user computing entity.

In another example, a method of locking a tracking apparatus that is affixed to an asset is provided. In some examples, the tracking apparatus comprising an electronic tag electronically coupled to a securing component having an actuating element. In some examples, the method comprises, in response to receiving a request to lock the tracking apparatus, determining whether a received input corresponds with a stored secure machine-readable code; and providing an indication to cause an electronic reader in electronic communication with the tracking apparatus to trigger activating the actuating element. In some examples, the electronic tag comprises a passive radio-frequency identification (RFID) tag, and wherein the electronic reader comprises an RFID reader. In some examples, the passive RFID tag comprises an EM4325 integrated circuit (IC) utilizing EPC global Class 1 Generation 2 (EPC C1G2) protocol. In some examples, the securing component comprises an electromagnetic lock or digital lock.

In yet another example, an apparatus is provided. The apparatus may comprise an electronic tag; a securing component configured to affix the tracking apparatus to an asset, the securing component having an actuating element; and a display element configured to display asset information, wherein the tracking apparatus is configured to, in response to receive an indication from an electronic reader in electronic communication with the electronic tag, provide a control indication to trigger deactivating the actuating element. In some examples, the electronic tag comprises a passive RFID tag, and wherein the electronic reader comprises an RFID reader. In some examples, the electronic reader comprises a user computing entity. In some examples, the display element comprises an electronic ink display. In some examples, the passive RFID tag comprises an EM4325 IC utilizing EPC C1G2 protocol. In some examples, the tracking apparatus comprises a power harvesting element configured to store energy obtained from the RFID reader for operations of the tracking apparatus. In some examples, the indication from the electronic reader is provided in response to an authentication operation performed via a mobile application executing on a user computing entity. In some examples, the actuating element comprises a solenoid actuator operatively coupled to a locking mechanism. In some examples, the authentication operation comprises providing a secure machine-readable code, OTP or QR code or any type of secure code. In some examples, the authentication operation is initiated by a user scanning a machine-readable code displayed via the display element.

As such, the present disclosure provides a tracking apparatus for dynamically managing assets within an environment increasing operational throughput in a variety of applications.

Referring now to FIG. 1, an example schematic diagram depicting an example system 100 in accordance various embodiments of the present disclosure is provided. As depicted, the example system 100 comprises a tracking apparatus 102, one or more computing entities 106 (e.g., servers), one or more databases 104, one or more networks 105, one or more user computing entities 108, one or more electronic readers (e.g., RFID readers) 110, and/or the like. In various examples, the system 100 may operate to facilitate identification, monitoring and/or tracking of assets within a particular location or environment.

In various embodiments, the tracking apparatus 102 may be or comprise an electronic tag (e.g., RFID tag). In various examples, the electronic tag (e.g., RFID tag) may be an active electronic tag (e.g., comprising a power harvesting unit) or a passive electronic tag. Alternatively, in some examples, the tracking apparatus 102 may comprise a near-field communication (NFC) tag. In some examples, the tracking apparatus 102/electronic tag (e.g., RFID tag) may comprise an EM4325 interface. In some examples, the tracking apparatus 102 may comprise an electronic tag (e.g., RFID tag) with an integrated barcode.

As further depicted in FIG. 1, the system 100 comprises one or more electronic readers 110. The example electronic reader 110 may operate to identify, monitor and/or track assets within a particular location or environment. In some embodiments, the tracking apparatus 102, the one or more computing entities 106, the one or more databases 104, the one or more electronic readers 110, and/or the one or more user computing entities 108 are in electronic communication with each other over the one or more networks 105 such that they can exchange data (e.g., receive and transmit data) with one another (e.g., periodically and/or in response to requests). Each of the components of the system 100, including the tracking apparatus 102, the one or more computing entities 106, the one or more databases 104, the one or more user computing entities 108, and/or the one or more electronic readers 110 (e.g., RFID readers) may be in communication with one another over the same or different wireless or wired networks 105 including, for example, a wired or wireless Personal Area Network (PAN), Local Area Network (LAN), Metropolitan Area Network (MAN), Wide Area Network (WAN), cellular network, and/or the like. While FIG. 1 illustrates certain system components as separate, standalone devices, the various embodiments are not limited to this particular architecture.

As depicted in FIG. 1, the example system 100 comprises one or more computing entities 106. In general, the terms computing device, entity, device, system, and/or similar words used herein interchangeably may refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes may include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

In some examples, the computing entity 106 may also include one or more network and/or communications interfaces for communicating with various computing entities, such as by communicating data, content, information, and/or similar terms used herein interchangeably that can be transmitted, received, operated on, processed, displayed, stored, and/or the like.

In one embodiment, the computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like may be used to control certain aspects of the operation of the computing entity 106 with the assistance of the processing element and the operating system.

As indicated, in one embodiment, the computing entity 106 may also include one or more network and/or communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, computing entity 106 may be configured to communicate via wireless external communication networks using any of a variety of protocols, such as embedded sim (eSIM), remote sim provisioning (RSP), general packet radio service (GPRS), Universal Mobile Telecommunications System (UMTS), Code Division Multiple Access 200 (CDMA200), CDMA200 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing entity 106 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 106 components may be located remotely from other computing entity 106 components, such as in a distributed system. Furthermore, one or more of the components may be aggregated and additional components performing functions described herein may be included in the computing entity 106. Thus, the computing entity 106 can be adapted to accommodate a variety of needs and circumstances, such as including various components described with regard to a mobile application executing on the user computing entity 108, including various input/output interfaces.

As depicted in FIG. 1, the system 100 comprises a user computing entity 108. In various embodiments, the user computing entity 108 may be or comprise one or more mobile devices, wearable computing devices, and/or the like. An example user computing entity 108 may include an antenna, a transmitter (e.g., radio), a receiver (e.g., radio), and a processing element that provides signals to and receives signals from the transmitter and receiver, respectively. The signals provided to and received from the transmitter and the receiver, respectively, may include signaling information/data in accordance with an air interface standard of applicable wireless systems to communicate with various devices, such as a computing entity (e.g., central server), another user computing entity 108, and/or the like. In an example embodiment, the transmitter and/or receiver are configured to communicate via one or more SRC protocols. For example, the transmitter and/or receiver may be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna, transmitter, and receiver may be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like. The user computing entity 108 may also include one or more network and/or communications interfaces for communicating with various computing entities, such as by communicating data, content, information, and/or similar terms used herein interchangeably that can be transmitted, received, operated on, processed, displayed, stored, and/or the like.

In this regard, the user computing entity 108 may be capable of operating with one or more air interface standards, communication protocols, modulation types, and access types. More particularly, the user computing entity 108 may operate in accordance with any of a number of wireless communication standards and protocols. In a particular embodiment, the user computing entity 108 may operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 108 can communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 108 can also download changes, add-ons, and updates, for instance, to its firmware, software (e.g., including executable instructions, applications, program modules), and operating system.

According to one embodiment, the user computing entity 108 may include location determining aspects, devices, modules, functionalities, and/or similar words used herein interchangeably to acquire location information/data regularly, continuously, or in response to certain triggers.

The user computing entity 108 may also comprise a user interface device comprising one or more user input/output interfaces (e.g., a display and/or speaker/speaker driver coupled to a processing element and a touch interface, keyboard, mouse, and/or microphone coupled to a processing element). For example, the user interface may be configured to provide a mobile application, browser, interactive user interface, dashboard, webpage, and/or similar words used herein interchangeably executing on and/or accessible via the user computing entity 108 to cause display or audible presentation of information/data and for user interaction therewith via one or more user input interfaces. Moreover, the user interface can comprise or be in communication with any of a number of devices allowing the user computing entity 108 to receive information/data, such as a keypad (hard or soft), a touch display, voice/speech or motion interfaces, scanners, readers, or other input device. In embodiments including a keypad, the keypad can include (or cause display of) the conventional numeric (0-9) and related keys (#, *), and other keys used for operating the user computing entity 108 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 108 can capture, collect, store information/data, user interaction/input, and/or the like.

The user computing entity 108 can also include volatile storage or memory and/or non-volatile storage or memory, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the user computing entity 108.

As depicted in FIG. 1, any two or more of the illustrative components of the system 100 of FIG. 1 may be configured to communicate with one another via one or more networks 105. The networks 105 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 105 may have any suitable communication range associated therewith and may include, for example, global networks (e.g., the Internet), MANs, WANs, LANs, or PANs. In addition, the networks 105 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 1 provides an example system 100, it is noted that the scope of the present disclosure is not limited to the example shown in FIG. 1. In some examples, the system 100 may comprise one or more additional and/or alternative elements, and/or may be different from that illustrated in FIG. 1.

Figure 2:
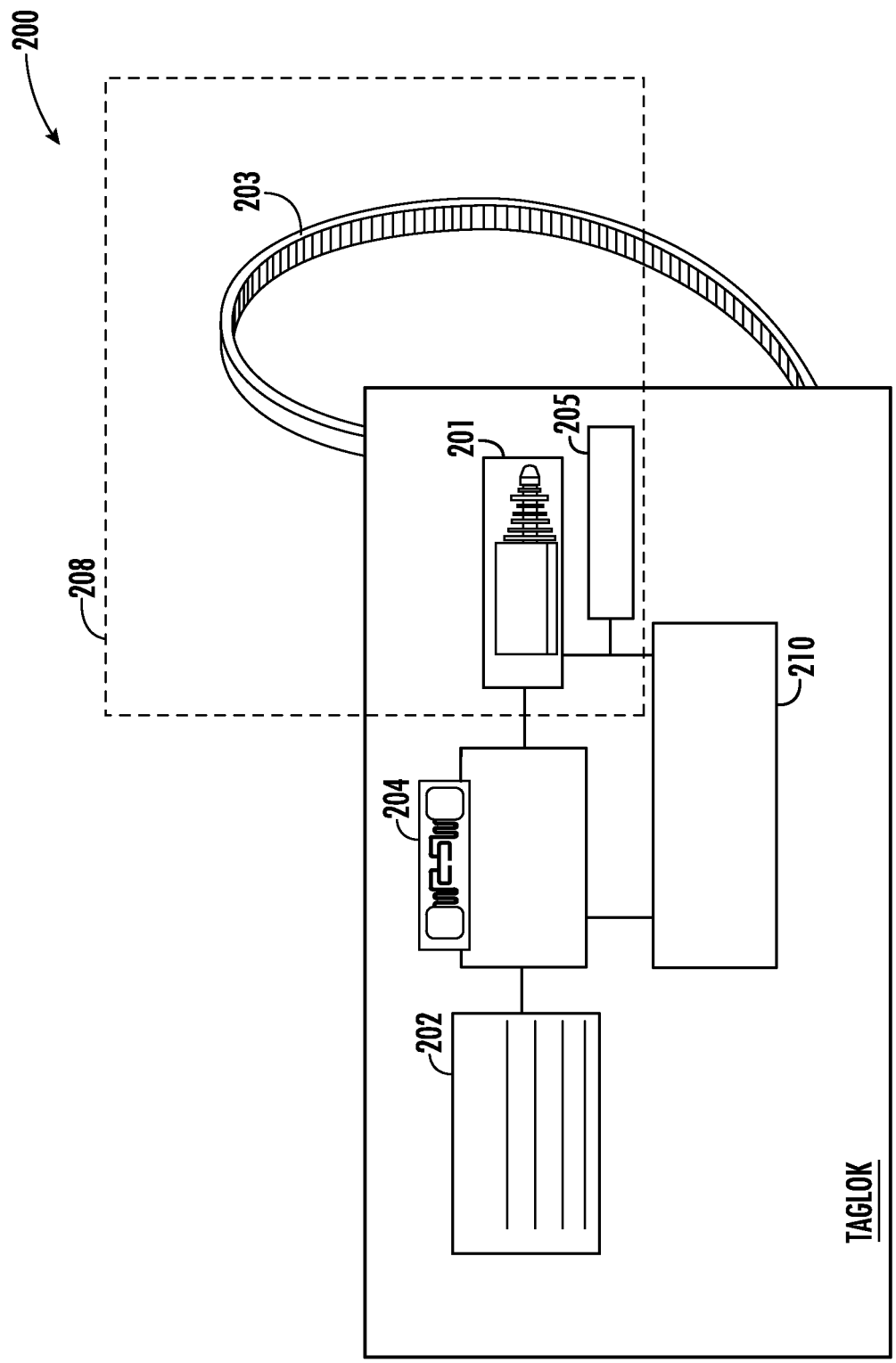
FIG. 2 illustrates an example apparatus in accordance with various embodiments of the present disclosure.

Referring now to FIG. 2, an example schematic diagram depicting a perspective view of an example tracking apparatus 200 is provided. In various examples, the tracking apparatus 200 may be part of a system configured to identify, monitor and/or track assets within a particular environment (e.g., warehouse, airport, or the like). As depicted in FIG. 2, the example tracking apparatus 200 comprises a display element 202, an electronic tag 204 (e.g., passive RFID tag), a power harvesting element 210 and a securing component 208.

As depicted in FIG. 2, the tracking apparatus 200 comprises an electronic tag 204 (e.g., passive RFID tag). The example electronic tag 204 (e.g., RFID tag) may be or comprise an IC disposed on a semiconductor die. The electronic tag 204 may be configured to receive RF signals (e.g., energy, information) from an electronic reader (e.g., RFID reader). For example, an electronic reader may generate RF signal(s) in order to interrogate the electronic tag 204. The electronic tag 204 may, in some examples, generate a reflected RF signal (e.g., by generating backscatter reflecting a portion of the RF signal(s)) in response to sensing/receiving the RF signal from the electronic reader (e.g., RFID reader). The reflected RF signal may comprise data/information (e.g., encoded data/information) stored by the electronic tag 204. In some examples, the electronic reader may be configured to decode and/or demodulate the reflected RF signal containing the encoded data/information. In various examples, the electronic tag 204 may be or comprise an active electronic tag or a passive electronic tag. The electronic tag 204 may be or comprise an EM4325 IC. The electronic tag 204 may comprise a configurable Serial Peripheral Interface (SPI) to facilitate communication with other elements or devices. In one example, the SPI may enable the electronic tag 204 (e.g., RFID tag) to provide information for display via a display element 202 of the tracking apparatus 200. As noted above, the electronic tag 204 (e.g., RFID tag) may be a passive electronic tag (e.g., RFID tag) in electronic communication with an electronic reader such that it can exchange data and/or information therewith. In some examples, the electronic tag 204 (e.g., RFID tag) may utilize the EPC global Class 1 Generation 2 protocol (EPC C1G2).

In some examples, as depicted in FIG. 2, the tracking apparatus 200 comprises a power harvesting element 210 such as a capacitive element/capacitor configured to store energy harvested from another device (e.g., an electronic reader) in electronic communication with the tracking apparatus 200 in order to provide power to the tracking apparatus 200 for various operations (e.g., to provide power for the electronic tag 204 (e.g., RFID tag), securing component 208 and/or display element 202). Accordingly, as described herein, one or more elements of the tracking apparatus 200 may be powered by power harvested from another apparatus/device (e.g., an electronic reader in electronic communication therewith. In other examples, the tracking apparatus 200 may comprise an active electronic tag (e.g., RFID tag) with an on-board power supply element (e.g., replaceable or rechargeable battery).

As noted above, and as depicted in FIG. 2, the tracking apparatus 200 comprises a display element 202. The example display element 202 may be or comprise electronic paper/e-paper (e.g., electronic ink (e-ink), electrophoretic display, electro-fluidic display, CLEARink or the like) or any other type of reflective panel or display. The display element 202 may be configured to display at least a portion of data/information provided by (i.e., written by) the electronic tag 204 (e.g., RFID tag) in electronic communication therewith. By way of example, the display element 202 may be configured to display information associated with an asset to which the tracking apparatus 200 is affixed. The display element 202 may be electronically coupled to the electronic tag 204 (e.g., RFID tag) via the SPI. In some examples, the electronic tag 204 (e.g., RFID tag) may provide a control indication/signal to actuate a capacitor element 205 (e.g., supercapacitor) in order to write information to the display element 202 via the SPI. The display element 202 may continue to store and/or display the data/information provided by the electronic tag 204 (e.g., RFID tag) until it receives another control indication/signal.

As noted above, and as depicted in FIG. 2, the tracking apparatus 200 comprises a securing component 208. In various examples, the securing component 208 may be removably attached or affixed to an asset (e.g., baggage, package or object) such that a location of the asset and/or other asset information can be provided (e.g., for tracking and/or identifying the example asset) within a particular environment such as, for example, without limitation, an airport or warehouse. The securing component 208 may be actuated (e.g., secured, affixed) and/or deactivated (e.g., released, removed) in response to control indications/signals provided by the electronic tag 204 (e.g., via a control element or switch) electronically coupled thereto.

As depicted in FIG. 2, the example securing component 208 comprises an actuating element 201, a securing band 203 and a capacitor element 205 (e.g., supercapacitor). In some examples, as shown, the securing band 203 is a circular band (e.g., cable lock, cable tie, zip tie, or the like) configured to be removably affixed or attached to an asset (e.g., baggage). The example securing band 203 may comprise plastic, textiles or similar materials. The securing band 203 may be operatively coupled with the actuating element 201 and the capacitor element 205 such that the securing band 203 can be securely affixed and/or detached from an asset. For example, the securing band 203 may comprise a sawtooth configuration similar to a cable tie or zip tie that allows a user to mechanically affixed the securing band 203 to an asset. However, in such examples, the user may be unable to detach or remove the securing band 203 without providing an electronic indication/signal (e.g., to deactivate the actuating element 201 that is operatively coupled with the securing band 203). Accordingly, subsequent to mechanically affixing the securing band 203 to an asset, in some examples, a control signal or indication may be required in order to detach or remove the securing band 203 from the asset (e.g., in order to deactivate the actuating element 201 and the capacitor element 205 such that the securing band 203 can be detached or removed from the asset). In some examples, a first electronic indication/signal may be required to affix the securing band 203 to the asset and a second electronic indication/signal may be required to detach or remove the securing band 203 from the asset.

In some examples the actuating element 201 may be a solenoid actuator. The example solenoid actuator may be excitable to release a locking mechanism (e.g., a mechanical rod disposed within a shaft disposed adjacent the solenoid actuator). Accordingly, in response to receiving a control indication/signal, the actuating element 201 may release the locking mechanism operatively coupled thereto such that the tracking apparatus 200 can be removed or detached from the asset. In some examples, the actuating element 201 may cause a switch to open in response to receiving a control indication/signal provided by the tracking apparatus 200 using the SPI. In other examples, the securing component 208 may comprise an electromagnetic lock or digital lock that operates to lock the tracking apparatus 200 affixed to an asset (e.g., in response to receiving a control indication/signal).

While FIG. 2 provides an example tracking apparatus 200, it is noted that the scope of the present disclosure is not limited to the example shown in FIG. 2. In some examples, the tracking apparatus 200 may comprise one or more additional and/or alternative elements, and/or may be different from that illustrated in FIG. 2.

Figure 3:
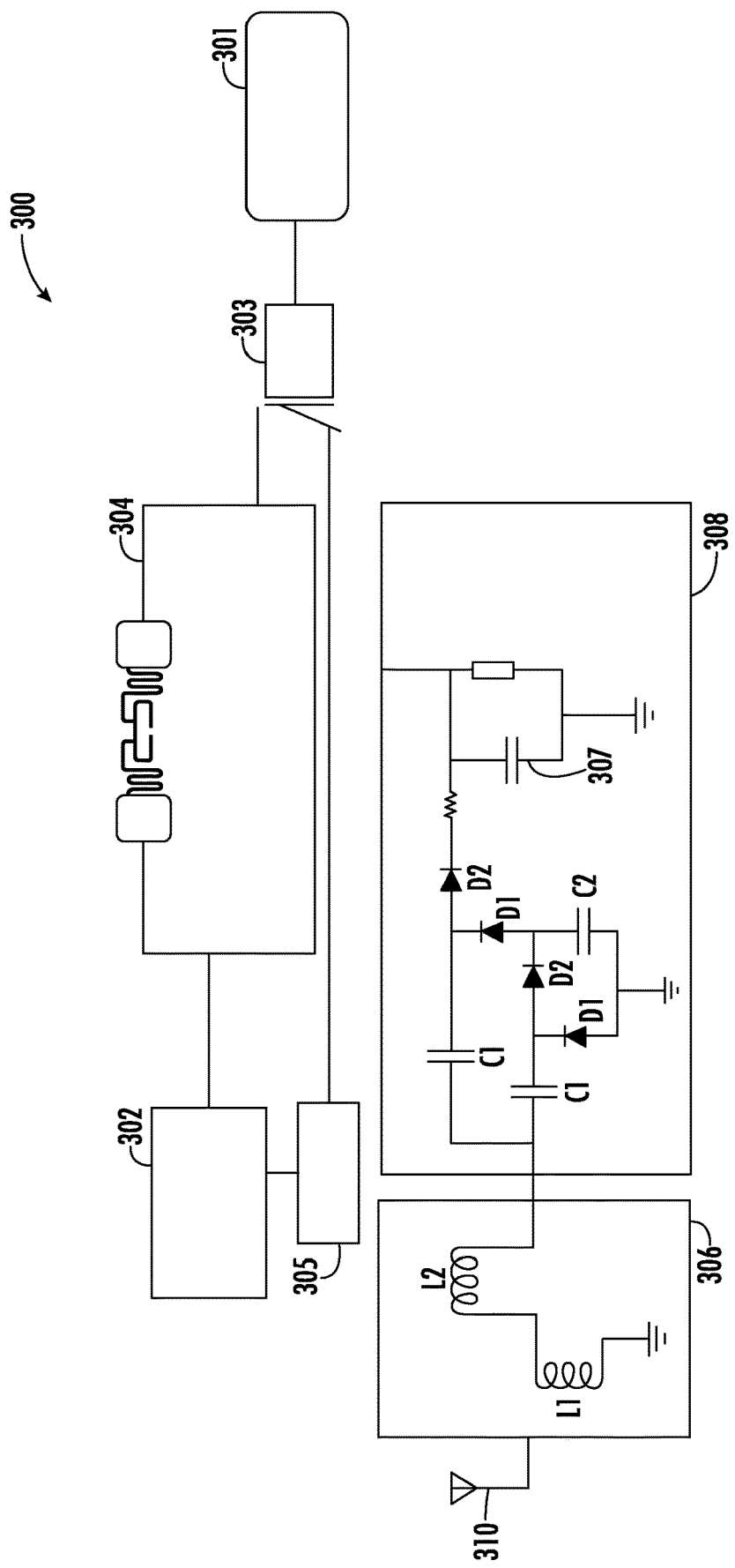
FIG. 3 illustrates an example apparatus in accordance with various embodiments of the present disclosure.

Referring now to FIG. 3, a schematic diagram depicting an example tracking apparatus 300 is provided. In various examples, the tracking apparatus 300 may be part of a system configured to identify, monitor and/or track assets within a particular location. As depicted in FIG. 3, the example tracking apparatus 300 comprises an actuating element 301, display 302, switching element 303, an electronic tag 304 (e.g., RFID tag), a charge pump 305, a matching network circuit 30, a rectifier circuit 308 and a receiving antenna 310.

In various examples, the tracking apparatus 300 may comprise a securing component which can be removably attached or affixed to an asset (e.g., baggage, package or object) such that a location of the asset and/or other asset information can be provided (e.g., for tracking and/or identifying the example asset) within a particular environment. In various examples, the securing component may be operatively coupled to the actuating element 301 that can be actuated and/or deactivated in response to control indications/signals provided by the electronic tag 304 (e.g., RFID tag), for instance, via a control element or switching element 303 operatively coupled thereto.

As depicted in FIG. 3, the tracking apparatus 300 comprises an electronic tag 304 (e.g., RFID tag). The example electronic tag 304 (e.g., RFID tag) may be or comprise an IC disposed on a semiconductor die. The electronic tag 304 (e.g., RFID tag) may be configured to receive RF signals (e.g., energy, information) from an electronic reader (e.g., RFID reader). In various examples, the electronic tag 304 (e.g., RFID tag) may be or comprise an active electronic tag or a passive electronic tag. The electronic tag 304 (e.g., RFID tag) may be or comprise an EM4325 IC. The electronic tag 304 (e.g., RFID tag) may comprise a configurable Serial Peripheral Interface (SPI) to facilitate communication with other elements or devices. In one example, the SPI may enable the electronic tag 304 (e.g., RFID tag) to provide information for display via a display element 302 of the tracking apparatus 300. The electronic tag 304 (e.g., RFID tag) may be a passive electronic tag (e.g., RFID tag) in electronic communication with an Electronic reader (e.g., RFID reader) such that it can exchange data and/or information therewith. In some examples, the electronic tag 304 (e.g., RFID tag) may utilize the EPC global Class 1 Generation 2 protocol (EPC C1G2).

As noted above, the tracking apparatus 300 comprises a receiving antenna 310 configured to, in conjunction with the matching network circuit 306, exchange data/information with another device (e.g., an electronic reader (e.g., RFID reader) comprising a transmitting antenna). The receiving antenna 310 may be configured to receive an RF signal (e.g., generated by the electronic reader). As depicted, the matching network circuit 306 comprises an L-network impedance circuit which may operate to maximize/amplify received RF signals.

As further depicted, the tracking apparatus 300 comprises a rectifier circuit 308. As shown, the rectifier circuit 308 comprises a two-stage Dickson Rectifier circuit which operates to condition a signal (e.g., a received RF signal) into a DC output voltage signal such that a capacitor element 307 (e.g., supercapacitor) of the rectifier circuit 308 can store/utilize the energy produced for operations of the tracking apparatus 300. In some examples, in response to detecting an RF signal, the capacitor element 307 may begin to charge/store energy. When the voltage at the terminals of the capacitor element 307 reach a predetermined threshold value, the capacitor element 307 may begin to charge/store energy. As such, the receiving antenna 310, matching network circuit 306 and rectifier circuit 308 may be configured to harvest/receive energy in order to charge the capacitor element 307 so as to provide/store power for use by various elements of the tracking apparatus 300 (e.g., the actuating element 301, the display element 302, the electronic tag 304, and/or the like). Additionally, the receiving antenna 310, matching network circuit 306 and rectifier circuit 308 may generate control signals/indications to facilitate and/or control various operations of the tracking apparatus 300.

As noted above, and as depicted in FIG. 3, the tracking apparatus 300 comprises a display element 302. The example display element 302 may be or comprise electronic paper/e-paper (e.g., electronic ink (e-ink), electrophoretic display, electro-fluidic display, CLEARink or the like) or any other type of reflective panel or display. The display element 302 may be configured to display at least a portion of data/information provided by (i.e., written by) the electronic tag 304 (e.g., RFID tag) in electronic communication therewith. By way of example, the display element 302 may be configured to display information associated with an asset to which the tracking apparatus 300 is affixed. The display element 302 may be electronically coupled to the electronic tag 304 (e.g., RFID tag) via an SPI. In some examples, the electronic tag 304 (e.g., RFID tag) may provide a control indication/signal to actuate a charge pump 305 that is operatively coupled thereto in order to provide/write information to the display element 302 via the SPI. The display element 302 may continue to store and/or display the data/information provided by the electronic tag 304 (e.g., RFID tag) until it receives another control indication/signal. By way of example, as an asset traverses a facility, it may be scanned by a plurality of stationary electronic readers at a plurality of fixed locations. Accordingly, the electronic readers may provide indications to update the asset information stored by the tracking apparatus as the asset to which it is affixed traverses an environment.

As depicted in FIG. 3, the example tracking apparatus 300 comprises an actuating element 301 operatively coupled to a switching element 303. In some examples, an electronic indication/signal may be provided to the actuating element 301 in order to release or deactivate a locking mechanism operatively coupled thereto such that the tracking apparatus 300 can be removed or detached from an asset. Similarly, an electronic indication/signal may be provided to the actuating element 301 in order to actuate/activate a locking mechanism such that the tracking apparatus 300 cannot be removed or detached from the asset. The actuating element 301 may be a solenoid actuator excitable to release the locking mechanism (e.g., a mechanical rod disposed within a shaft disposed adjacent the solenoid actuator). In some examples, the actuating element 301 may be or comprise an electromagnetic lock or digital lock.

As depicted in FIG. 3, the tracking apparatus 300 comprises a switching element 303. The switching element 303 may be configured to operate in conjunction with the actuating element 301, and in response to receiving a control indication/signal, to release a locking mechanism in order to remove or detach the tracking apparatus 200 from the asset.

While FIG. 3 provides an example tracking apparatus 300, it is noted that the scope of the present disclosure is not limited to the example shown in FIG. 3. In some examples, the tracking apparatus 300 may comprise one or more additional and/or alternative elements, and/or may be different from that illustrated in FIG. 3.

Figure 4:
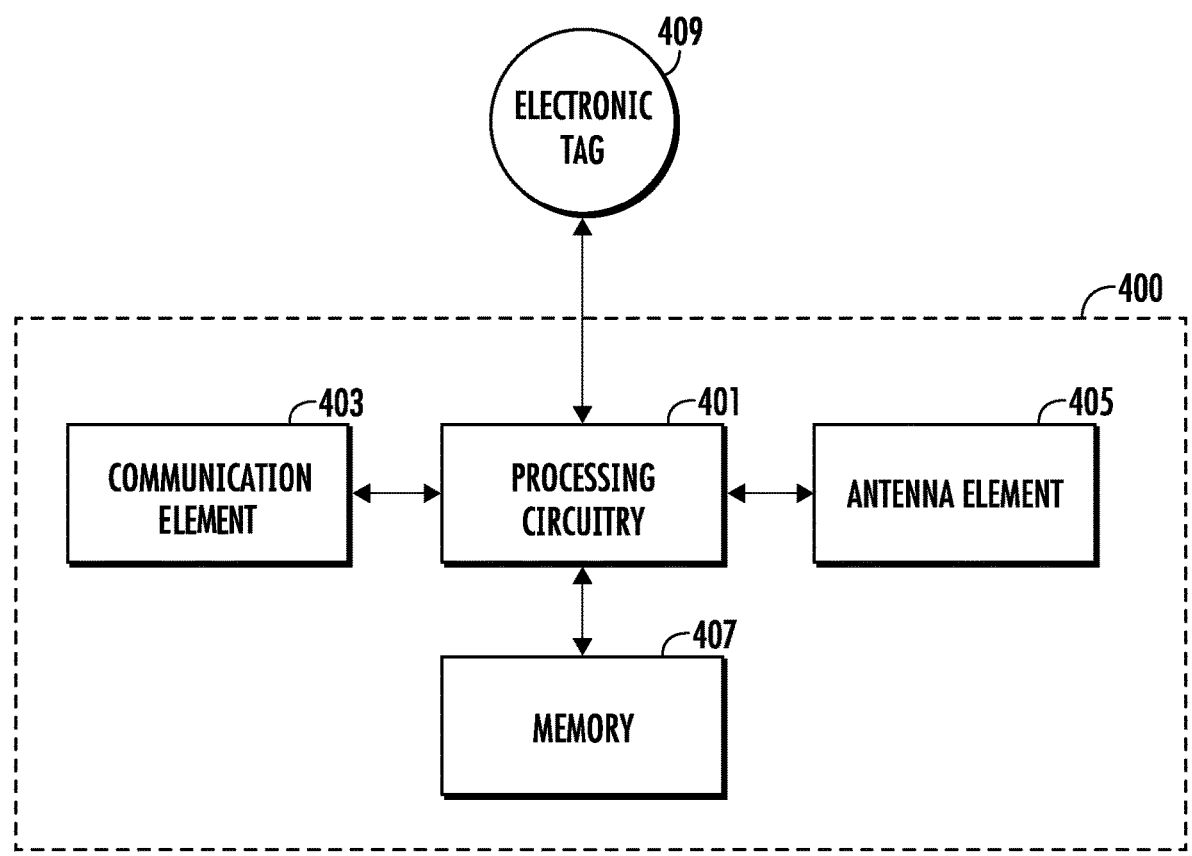
FIG. 4 illustrates an example electronic reader in electronic communication with an electronic tag in accordance with various embodiments of the present disclosure.

Referring now to FIG. 4, a schematic diagram depicting an example processing component 400 of an example electronic reader (e.g., RFID reader) in electronic communication with an electronic tag (e.g., RFID tag) of a tracking apparatus in accordance with various embodiments of the present disclosure is provided. As shown, the processing component 400 comprises processing circuitry 401, a communication element 403, antenna element 405, a memory 407 and/or other components configured to perform various operations, procedures, functions or the like described herein.

The processing circuitry 401 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 4 as a single processor, in an embodiment, the processing circuitry 401 may include a plurality of processors and signal processing modules. The plurality of processors may be embodied on a single electronic device or may be distributed across a plurality of electronic devices collectively configured to function as the circuitry of the electronic reader (e.g., RFID reader). The plurality of processors may be in operative communication with each other and may be collectively configured to perform one or more functionalities of the circuitry of the electronic reader (e.g., RFID reader) as described herein. In an example embodiment, the processing circuitry 401 may be configured to execute instructions stored in the memory 407 or otherwise accessible to the processing circuitry 401. These instructions, when executed by the processing circuitry 401, may cause the circuitry of the electronic reader (e.g., RFID reader) to perform one or more of the functionalities, as described herein.

Whether configured by hardware, firmware/software methods, or by a combination thereof, the processing circuitry 401 may include an entity capable of performing operations according to embodiments of the present disclosure while configured accordingly. Thus, for example, when the processing circuitry 401 is embodied as an ASIC, FPGA or the like, the processing circuitry 401 may include specifically configured hardware for conducting one or more operations described herein. Additionally, or alternatively, when the processing circuitry 401 is embodied as an executor of instructions, such as may be stored in the memory 407, the instructions may specifically configure the processing circuitry 401 to perform one or more algorithms and operations described herein.

Thus, the processing circuitry 401 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a combination thereof. The memory can also be located internal to another computing resource (e.g., enabling computer readable instructions to be downloaded over the Internet or another wired or wireless connection).

The memory 407 may include suitable logic, circuitry, and/or interfaces that are adapted to store a set of instructions that is executable by the processing circuitry 401 to perform predetermined operations. Additionally or alternately, the memory 407 may be configured to store data/information (obtained from the electronic tag 409). Example memory implementations may include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory 407 may be integrated with the processing circuitry 401 on a single chip, without departing from the scope of the disclosure.

The communication element 403 may include suitable logic and/or circuitry that may enable the communication element 403 to facilitate transmission and reception of messages and data to and from various devices. For example, the communication element 403 may be communicatively coupled with a server. Examples of the communication element 403 may include, but are not limited to, an antenna, an Ethernet port, a USB port, a serial port, or any other port that can be adapted to receive and transmit data. The communication element 403 may transmit and receive data and/or messages in accordance with the various communication protocols, such as, but not limited to, EPC global, DOD, I2C, TCP/IP, UDP, and 2G, 3G, 4G or 5G communication protocols.

In some examples, the communication element 403 may facilitate communication with the electronic tag (e.g., RFID tag) 409. In some examples, the communication element 403 may be communicatively coupled with the antenna element 405. In some examples, the communication element 403 may be configured to transmit/receive data through the antenna element 405 by utilizing one or more of EPC global communication standards or DOD communication standards.

The processing circuitry 401 of the electronic reader (e.g., RFID reader) may include suitable logic and/or circuitry for reading data/information provided by the electronic tag 409. To read the data/information, the processing circuitry 401/ communication element 403 may cause the antenna element 405 to transmit an interrogation command. The processing circuitry 401 may cause the communication element 403 to modulate the interrogation command, over the, using one or more modulation techniques (such as amplitude-shift keying (ASK) and phase jitter modulation (PJM)). In response to the interrogation command, the processing circuitry 401/ communication element 403 may receive the data/information from the electronic tag 409 (e.g., RFID tag).

In some examples, the processing circuitry 401 may include one or more of filters, analog to digital (A/D) converters, digital to analog (D/A) convertors, matching circuits, amplifiers, and/or tuners that may enable the communication element 403 to transmit data (e.g., interrogation commands) and receive data/information over one or more frequency bands through the antenna element 405. The processing circuitry 401 may be implemented using one or more of Application Specific Integrated Circuit (ASIC) and Field Programmable Gate Array (FPGA). The electronic reader may comprise a noise cancellation circuit including suitable logic and/or circuitry that may reduce the interference amongst the signals transmitted/received by the antenna element 405. In some examples, the noise cancellation circuit may include one or more filters, one or more phase shifters and/or the like.

Figure 5A:
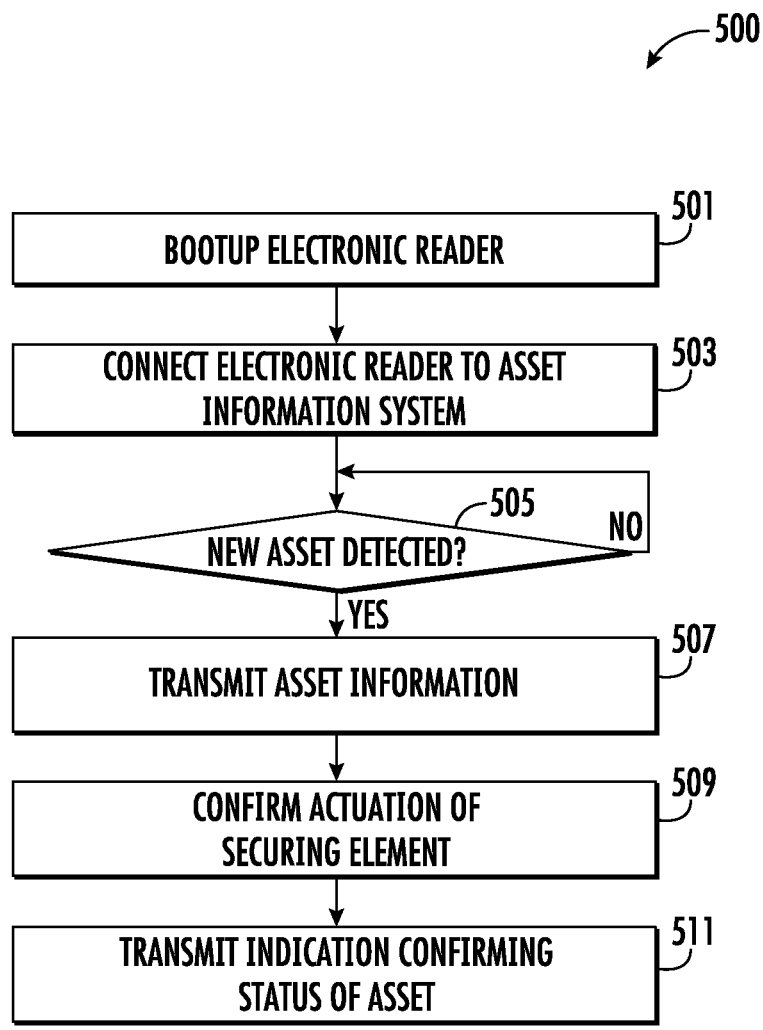
FIG. 5A is a flowchart diagram illustrating example operations in accordance with various embodiments of the present disclosure.

Referring now to FIG. 5A, a flowchart diagram illustrating example operations 500 in accordance with various embodiments of the present disclosure is provided. In some examples, the method 500 may be performed by various system components (for example, but not limited to, processing circuitry 401 of the electronic reader (e.g., RFID reader) described above with regard to FIG. 4). In some examples, the processing circuitry may be electrically coupled to and/or in electronic communication with other circuitries, such as, but not limited to, tracking apparatus comprising an electronic tag (e.g., RFID tag), a memory (such as, for example, random access memory (RAM) for storing computer program instructions), and/or the like.

The example method 500 begins at step/operation 501. At step/operation 501, processing circuitry (such as, but not limited to, the processing circuitry 401 of the electronic reader (e.g., RFID reader) illustrated with regard to FIG. 4, discussed above) boots up the electronic reader (e.g., RFID reader). In some examples, the electronic reader (e.g., RFID reader) may boot up in response to receiving a control indication/signal (e.g., from a computing entity). In various embodiments, the electronic reader (e.g., RFID reader) may be a handheld device (e.g., a user operated device) or a stationary electronic reader disposed/attached to a surface within an environment (e.g., adjacent a baggage carousel within an airport). The example stationary electronic reader (e.g., RFID reader) may be in a dormant or latent state until it detects an asset (e.g., a tracking apparatus comprising an electronic tag (e.g., RFID tag)). In some examples, the example stationary electronic reader (e.g., RFID reader) may continuously scan for electronic tags (e.g., every second).

Subsequent to step/operation 501, the example method 500 proceeds to step/operation 503. At step/operation 503, processing circuitry establishes a connection to an asset information system (e.g., a central server) such that the electronic reader (e.g., RFID reader) and the asset information system can exchange data/information with one another. The asset information system may be or comprise a computing entity, such as but not limited to the computing entity 106 described above in connection with FIG. 1.

Subsequent to step/operation 503, the example method 500 proceeds to step/operation 505. At step/operation 505, processing circuitry determines whether a new asset is detected. In some examples, a user (e.g., agent) may mechanically attach an example tracking apparatus to an asset (e.g., baggage) prior to or subsequent to processing circuitry determining that a new asset has been detected.

In some embodiments, the example tracking apparatus may comprise an electromagnetic lock or digital lock. In such examples, in order to lock the tracking apparatus in conjunction with affixing or attaching the tracking apparatus to an asset, a user may initiate a request to lock the tracking apparatus (e.g., by providing an input to an asset information system via a user computing entity). In response to receiving the request to lock the tracking apparatus, in some examples, the asset management system may determine whether a received input corresponds with a stored secure machine-readable code. Then, the asset information system may provide an indication to cause an electronic reader in electronic communication with the tracking apparatus to trigger activating the actuating element in order to lock the tracking apparatus to the asset.

Subsequent to step/operation 505, the example method 500 proceeds to step/operation 507. At step/operation 507, processing circuitry transmits the asset information to an electronic tag (e.g., RFID tag) of a tracking apparatus in order to write information to its memory. For example, the electronic reader (e.g., RFID reader) may obtain (e.g., request, receive) asset information from the asset information system (e.g., central server) and transmit an RF signal comprising asset information. In one example, asset information may describe a destination, passenger information (e.g., name, address), flight information (e.g., gate information, flight time) or the like. The electronic tag (e.g., RFID tag) may be configured to decode and/or demodulate an RF signal containing encoded data/information. In some examples, the electronic reader (e.g., RFID reader) may provide a control indication to enable the SPI interface on the electronic tag (e.g., RFID tag) IC. Then, the electronic reader (e.g., RFID reader) may provide asset information using a particular protocol. For example, the electronic reader (e.g., RFID reader) may transmit an RF signal comprising asset information using an EPC C1G2 protocol including instructions for displaying at least a portion of the asset information via a display element of the tracking apparatus.

Subsequent to step/operation 507, the example method 500 proceeds to step/operation 509. At step/operation 509, processing circuitry confirms actuation of the securing component of the tracking apparatus. For example, the electronic reader (e.g., RFID reader) may read an electronic tag (e.g., RFID tag) input/output (I/O) pin to ensure that a locking mechanism (e.g., solenoid actuator) is connected/properly actuated. In an instance in which the electronic reader (e.g., RFID reader) detects that the locking mechanism is not properly actuated, the electronic reader (e.g., RFID reader) may provide an indication (e.g., via a display element of the electronic reader (e.g., RFID reader) to alert the user (e.g., agent).

Subsequent to step/operation 509, the method 500 proceeds to step/operation 511. At step/operation 511, processing circuitry transmits an indication confirming the status of the asset to the asset information system (e.g., central server). For example, the processing circuitry may transmit an indication requesting that the asset information system (e.g., central server) generate a secure code (e.g., machine-readable code, QR code, one-time password (OTP), dynamic pin, or the like) associated with the entry for the asset/tracking apparatus. Subsequent to transmitting the indication requesting generation of the secure code, the method 500 may return to step/operation 505 and the processing circuitry may restart the method 500 in response to detecting a new asset.

Figure 5B:
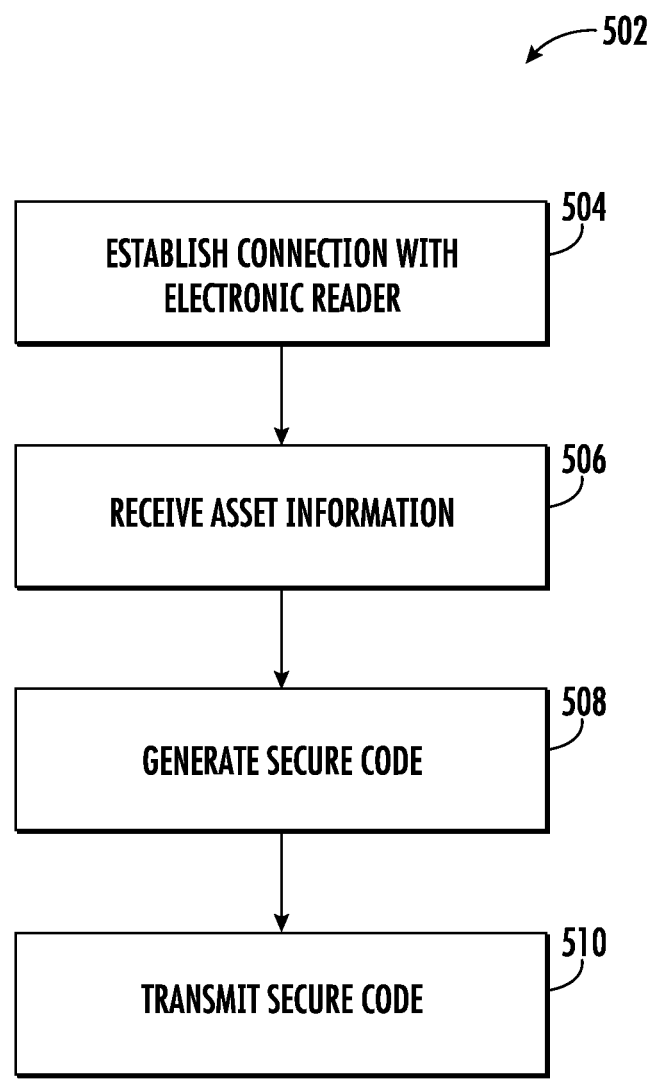
FIG. 5B is a flowchart diagram illustrating example operations in accordance with various embodiments of the present disclosure.

Referring now to FIG. 5B, a flowchart diagram illustrating example operations 502 in accordance with various embodiments of the present disclosure is provided. In some examples, the method 502 may be performed by various system components (for example, but not limited to, processing circuitry of a computing entity 106 described above with regard to FIG. 1). The computing entity 106 may be or comprise an asset information system (e.g., central server). In some examples, the processing circuitry may be electrically coupled to and/or in electronic communication with other circuitries, such as, but not limited to, an electronic reader (such as, for example, electronic reader described above in connection with FIG. 4).

The example method 502 begins at step/operation 504. At step/operation 504, processing circuitry (such as, but not limited to, the processing circuitry of the computing entity 106 described above in connection with FIG. 1) establishes a connection with an electronic reader (e.g., RFID reader). For example, processing circuitry may establish a connection in response to receiving a request from the electronic reader (e.g., RFID reader) such that the electronic reader (e.g., RFID reader) and the processing circuitry (e.g., asset information system) can exchange data/information with one another.

Subsequent to step/operation 504, the method proceeds to step/operation 506. At step/operation 506, the processing circuitry receives asset information from the example electronic reader (e.g., RFID reader). The processing circuitry may store the received asset information in a database (such as, but not limited to, the database 104 described above in connection with FIG. 1). As noted above, in one example, the asset information may describe a destination, passenger information (e.g., name, address), flight information (e.g., gate information, flight time), or the like. For example, the processing circuitry may receive an indication comprising asset information and a request to generate a secure code (e.g., machine-readable code, QR code, OTP, or the like). The processing circuitry may receive the indication from the electronic reader (e.g., RFID reader) that has provided/written asset information to a tracking apparatus and confirmed that a locking mechanism of the tracking apparatus has been properly actuated.

Subsequent to step/operation 506, the method 502 proceeds to step/operation 508. At step/operation 508, the processing circuitry generates the secure code (e.g., machine-readable code, QR code, OTP, or the like). The processing circuitry may store the secure code (e.g., OTP) in association with the asset information (e.g., in a database).

Subsequent to step/operation 508, the method proceeds to step/operation 510. At step/operation 510, the processing circuitry transmits the secure code (e.g., machine-readable code, QR code, OTP). The processing circuitry may transmit the secure code to a user computing entity (such as, but not limited to, the user computing entity 108 described above in connection with FIG. 1). Additionally, the processing circuitry may transmit at least a portion of the stored asset information to the user computing entity. In some examples, a user may interact with the asset information system using a mobile application executing on the user computing entity. In some embodiments, a variety of sources can provide (e.g., transmit, send) a mobile application for download and execution on the user computing entity (e.g., in response to a request to download the mobile application generated at the user computing entity). In another example, the mobile application may be a browser executing on the user computing entity. The mobile application may comprise computer-executable program code (e.g., a software application) that provides the functionality described herein. The mobile application may be executed to enable various functionalities as discussed herein. Moreover, although specifically referenced as a mobile application, it should be understood that the mobile application may be executable by any of a variety of computing entity types, such as desktop computers, laptop computers, mobile devices, wearable devices and/or the like. In some embodiments, step/operation 510 is performed as part of registering a user. For example, a user profile for a user may be generated/created as part of registration. However, as will be recognized, a user profile may already exist and be stored in a user profile database; in such a case, registration may simply link to an existing user profile. Each user profile may be identifiable via one or more identifiers (e.g., participant IDs, usernames, globally unique identifiers (GUIDs), universally unique identifiers (UUIDs), and/or the like) configured to uniquely identify the user profile. Thus, as part of enrolling/registering a user, the mobile application (executing on the user computing entity) may request and receive various types of information/data.

For example, the mobile application (executing on the user computing entity) may request a user identifier or username. If a user profile corresponding to the user and associated with a user identifier already exists (e.g., is stored in a user profile database), the user information/data may comprise the user's access credentials (e.g., username, password, and/or the like). If a user profile corresponding to the user does not already exist, the user information/data may comprise information/data identifying the user (e.g., a username, a birthdate, and/or the like), user contact information/data (e.g., an electronic destination address, an email address, an instant messenger username, a social media username, an app username, a phone number associated with the user computing entity, and/or other relevant information/data. In various embodiments, the mobile application (executing on the user computing entity) receives the user information/data (e.g., via one or more user interfaces) and can provide the same to the computing entity (e.g., asset management system) for the generation/creation of and/or storage with a user profile. Asset information associated with a tracking apparatus may be associated with and/or otherwise stored in conjunction with the user profile. In some embodiments, the computing entity may be configured to automatically and/or periodically (e.g., at scheduled times) updated asset information to the user computing entity. In some embodiments, the computing entity may be configured to automatically and/or periodically (e.g., at scheduled times) update asset information to the user computing entity.

Figure 6A:
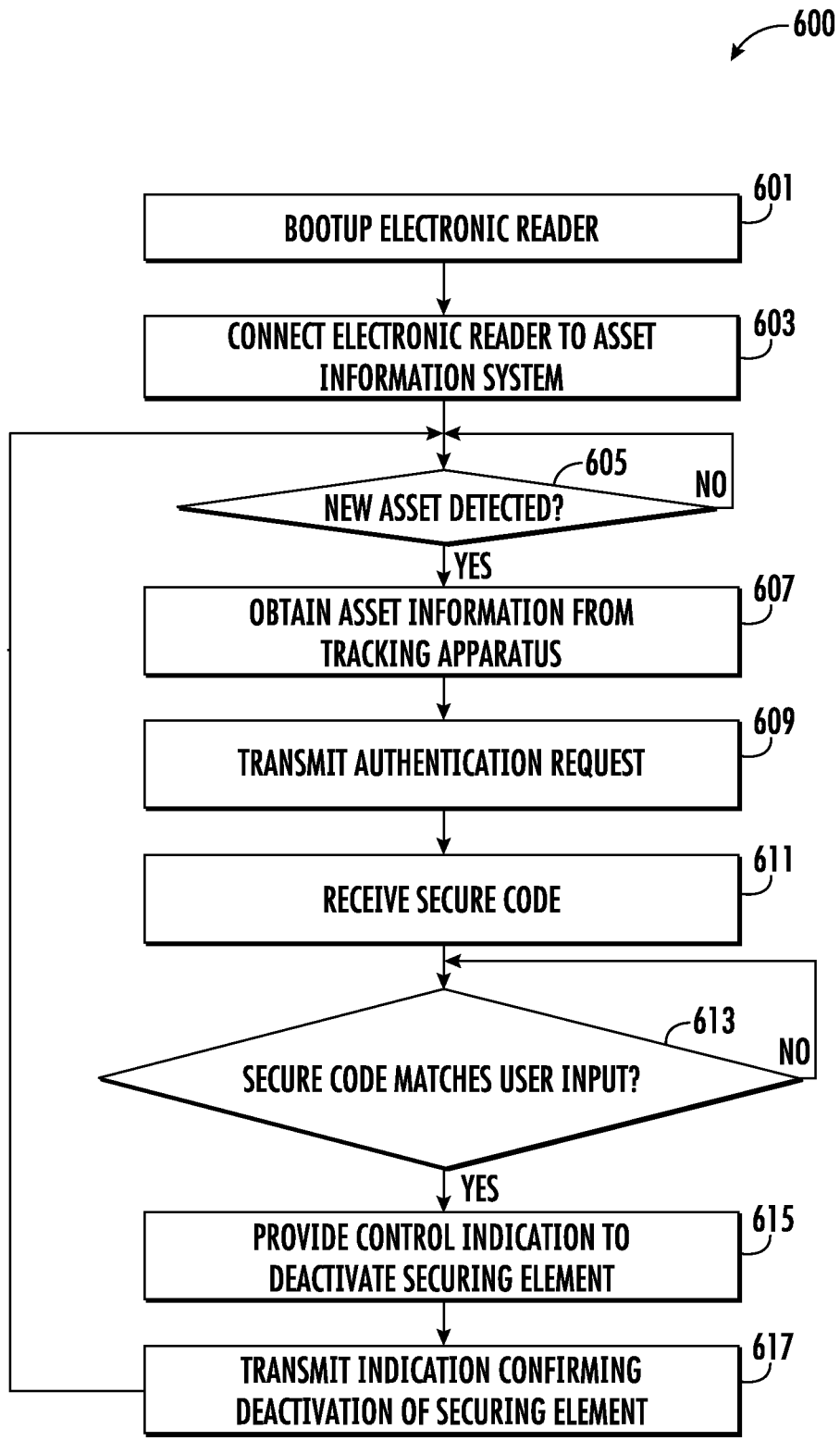
FIG. 6A is a flowchart diagram illustrating example operations in accordance with various embodiments of the present disclosure.

Referring now to FIG. 6A, a flowchart diagram illustrating example operations 600 in accordance with various embodiments of the present disclosure is provided. In some examples, the method 600 may be performed by various system components (for example, but not limited to, processing circuitry 401 of the electronic reader (e.g., RFID reader) described above with regard to FIG. 4). In some examples, the processing circuitry may be electrically coupled to and/or in electronic communication with other circuitries, such as, but not limited to, tracking apparatus comprising an electronic tag (e.g., RFID tag), a memory (such as, for example, random access memory (RAM) for storing computer program instructions), and/or the like.

The example method 600 begins at step/operation 601. At step/operation 601, processing circuitry (such as, but not limited to, the processing circuitry 401 of the electronic reader (e.g., RFID reader) illustrated with regard to FIG. 4, discussed above) boots up the electronic reader (e.g., RFID reader). In some examples, the electronic reader (e.g., RFID reader) may boot up in response to receiving a control indication/signal (e.g., from a computing entity). Additionally/alternatively, the method 600 may begin with a user retrieving an asset (e.g., baggage), in some examples with the assistance of and/or in conjunction with an assisting agent (e.g., airport agent).

Subsequent to step/operation 601, the example method 600 proceeds to step/operation 603. At step/operation 603, processing circuitry establishes a connection to an asset information system (e.g., a central server) such that the electronic reader (e.g., RFID reader) and the asset information system can exchange data/information with one another. The asset information system may be or comprise a computing entity, such as but not limited to the computing entity 106 described above in connection with FIG. 1.

Subsequent to step/operation 603, the example method 600 proceeds to step/operation 605. At step/operation 605, processing circuitry determines whether a new asset is detected. For example, the electronic reader (e.g., RFID reader) may, transmit a control indication/signal such as an RF signal (e.g., interrogation command) to an electronic tag (e.g., RFID tag)/tracking apparatus. In some examples, the tracking apparatus may also comprise a barcode with asset information that can be accessed (e.g., scanned) using a computing entity, user computing entity (e.g., via a mobile application executing on a user computing entity or mobile device), or the like. As such, detecting a new asset may be initiated by a user scanning the barcode affixed to the asset in order to access asset information associated with a tracking apparatus. By way of example, a printed barcode may be affixed to an asset and/or tracking apparatus.

Subsequent to step/operation 605, the example method 600 proceeds to step/operation 607. At step/operation 607, processing circuitry obtains asset information from the tracking apparatus/electronic tag (e.g., RFID tag). For example, in response to transmitting the RF signal (e.g., interrogation command, the electronic reader (e.g., RFID reader) may receive a reflected RF signal from the electronic tag (e.g., RFID tag). The electronic reader (e.g., RFID reader) may be configured to decode and/or demodulate the reflected RF signal containing encoded data/information (e.g., asset information). In one example, asset information may comprise a destination, passenger information (e.g., name, address), flight information (e.g., gate information, flight time) or the like.

Subsequent to step/operation 607, the method 600 proceeds to step/operation 609. At step/operation 609, processing circuitry transmits an authentication request (e.g., to the asset information system/central server) associated with the tracking apparatus. Additionally and/or alternatively, in some examples, a user (e.g., via a mobile application executing on a user computing entity) may scan the barcode affixed to the asset or displayed provided via the display element in order to initiate the authentication request.

Subsequent to step/operation 609, the method 600 proceeds to step/operation 611. At step/operation 611, in response to transmitting the authentication request, processing circuitry receives the secure code (e.g., machine-readable code, QR code, OTP, dynamic pin, or the like) stored in association with the asset information for the tracking apparatus by the asset information system. Additionally and/or alternatively, in response to an authentication request initiated, e.g., via a mobile application, the authentication information may be transmitted to the user computing entity (i.e., provided via the mobile application or a browser). In some examples, the authentication information may comprise user identifier information, biometric information, or the like.

Subsequent to step/operation 611, the method 600 proceeds to step/operation 613. At step/operation 613, processing circuitry determines whether the received secure code matches a user input. In some embodiments, step/operation 611 is performed as part of receiving/requesting user input. In various examples, the user may provide the user input via a mobile application executing on a user computing entity or via a browser executing on the user computing entity. In some embodiments, step/operation 613 may be performed by the asset management system (e.g., central server). For example, the asset management system may determine whether a secure code provided by a user (e.g., via a mobile application or browser) matches a stored secure code and transmit an indication confirming whether or not the authentication is successful to the processing circuitry (i.e., electronic reader). In other embodiments, the processing circuitry (i.e., electronic reader) may directly obtain the user input (e.g., via a user interface). In an instance in which the authentication is not successful, the electronic reader (e.g., RFID reader) may provide an alert to the user (e.g., via a display) or via the user computing entity (e.g., via the mobile application or browser).

Subsequent to step/operation 613, and in an instance in which the authentication is successful, the method 600 proceeds to step/operation 615. At step/operation 615, processing circuitry provides a control indication/signal to trigger deactivation of the securing element. As noted above, authentication may be confirmed by transmitting an indication directly to processing circuitry (i.e., electronic reader) and/or via a mobile application or browser executing on a user computing entity. For example, an electronic indication/signal may be provided to an actuating element of the tracking apparatus in order to release or deactivate a locking mechanism operatively coupled thereto such that the tracking apparatus can be removed or detached from an asset. The actuating element may be a solenoid actuator excitable to release the locking mechanism (e.g., a mechanical rod disposed within a shaft disposed adjacent the solenoid actuator).

Subsequent to step/operation 615, the method 600 proceeds to step/operation 617. At step/operation 617, processing circuitry transmits an indication confirming the status of the tracking apparatus to the asset information system (e.g., central server). For example, the processing circuitry may transmit an indication confirming deactivation of the securing element/tracking apparatus. In some examples, the user computing entity may transmit the indication confirming the status of the tracking apparatus. Subsequent to transmitting the indication confirming the status of the tracking apparatus, the method 600 may return to step/operation 605 and the processing circuitry may wait for a new asset to be detected (e.g., to receive a new request). In some examples, an attempt to leave the environment without removing the tracking apparatus may trigger an alarm or alert.

Figure 6B:
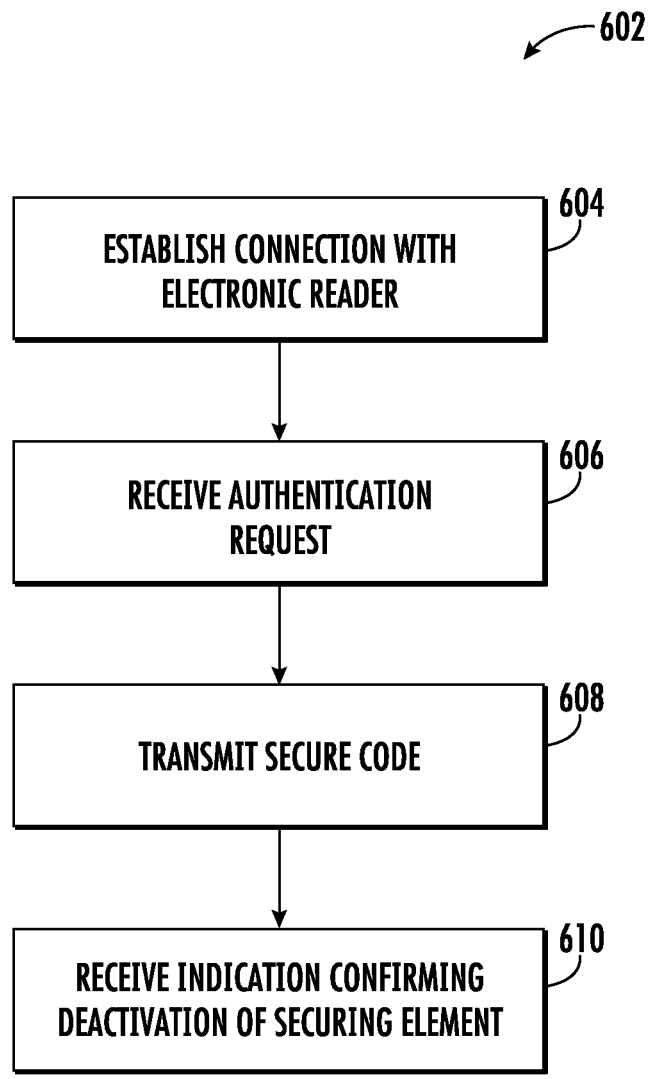
FIG. 6B is a flowchart diagram illustrating example operations in accordance with various embodiments of the present disclosure.

Referring now to FIG. 6B, a flowchart diagram illustrating example operations 602 in accordance with various embodiments of the present disclosure is provided. In some examples, the method 602 may be performed by various system components (for example, but not limited to, processing circuitry of a computing entity 106 described above with regard to FIG. 1). The computing entity 106 may be or comprise an asset information system (e.g., central server). In some examples, the processing circuitry may be electrically coupled to and/or in electronic communication with other circuitries, such as, but not limited to, an electronic reader (such as, for example, electronic reader described above in connection with FIG. 4).

The example method 602 begins at step/operation 604. At step/operation 604, processing circuitry (such as, but not limited to, the processing circuitry of the computing entity 106 described above in connection with FIG. 1) establishes a connection with an electronic reader (e.g., RFID reader). For example, processing circuitry may establish a connection in response to receiving a request from the electronic reader (e.g., RFID reader) such that the electronic reader (e.g., RFID reader) and the processing circuitry (e.g., asset information system) can exchange data/information with one another.

Subsequent to step/operation 604, the method 602 proceeds to step/operation 606. At step/operation 606, processing circuitry receives an authentication request. For example, the processing circuitry receives a request for a stored secure code (e.g., machine-readable code, QR code, OTP and/or the like) associated with a tracking apparatus from the electronic reader (e.g., RFID reader).

Subsequent to step/operation 604, the method 602 proceeds to step/operation 608. At step/operation 608, processing circuitry transmits the stored secured code to the electronic reader (e.g., RFID reader). In some examples, as noted above, instead of transmitting the stored secure code, processing circuitry may request user input of a secure code (e.g., via a mobile application or browser executing on a user computing entity) and determine whether the received secure code matches a secure code stored in association with asset information for the tracking apparatus.

Subsequent to step/operation 608, the method 602 proceeds to step/operation 610. At step/operation 610, processing circuitry receives an indication confirming deactivation of the securing element/tracking apparatus. For example, processing circuitry receives the indication from an electronic reader (e.g., RFID reader) subsequent to the electronic reader (e.g., RFID reader) providing a control indication to deactivate the securing element/tracking apparatus. Processing circuitry may update the stored asset information, such as by deleting the asset information associated with the tracking apparatus in anticipation of the tracking apparatus being reused in conjunction with another asset (e.g., baggage).

In some examples, one or more of the procedures described in FIGS. 5A, 5B, 6A and 6B may be embodied by computer program instructions, which may be stored by a memory (such as a non-transitory memory) of a system employing an embodiment of the present disclosure and executed by a processing component/circuitry of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information. In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method of unlocking a tracking apparatus that is affixed to an asset, the tracking apparatus comprising an electronic tag electronically coupled to a securing component having an actuating element, the method comprising:
   receiving an indication comprising asset information and a request to generate a secure machine-readable code;
   generating the secure machine-readable code in response to receiving the indication;
   receiving a request to unlock the tracking apparatus;
   in response to receiving the request to unlock the tracking apparatus, determining whether a received input corresponds with the secure machine-readable code; and
   providing a control indication to cause an electronic reader in electronic communication with the tracking apparatus to trigger deactivating the actuating element.

2. The method of claim 1, wherein the electronic tag comprises a passive radio-frequency identification (RFID) tag, and wherein the electronic reader comprises an RFID reader.

3. The method of claim 2, wherein the passive RFID tag comprises an EM4325 integrated circuit (IC) utilizing EPC global Class 1 Generation 2 (EPC C1G2) protocol.

4. The method of claim 1, wherein the tracking apparatus further comprises a display element, and wherein the tracking apparatus is configured to display at least a portion of the asset information via the display element.

5. The method of claim 4, wherein the display element comprises an electronic ink display.

6. The method of claim 5, wherein the tracking apparatus further comprises a power harvesting element configured to store energy obtained from an RFID reader for operations of the tracking apparatus.

7. The method of claim 1, wherein the received input is provided via a mobile application executing on a user computing entity.

8. The method of claim 1, wherein the secure machine-readable code comprises a one-time password (OTP) or QR code or pass-key.

9. The method of claim 1, further comprising subsequent to generating and storing the secure code, transmitting the secure machine-readable code to a user computing entity.

10. A method of locking a tracking apparatus that is affixed to an asset, the tracking apparatus comprising an electronic tag electronically coupled to a securing component having an actuating element, the method comprising:
    receiving an indication comprising asset information and a request to generate a secure machine-readable code;
    generating the secure machine-readable code in response to receiving the indication;
    receiving a request to unlock the tracking apparatus;
    in response to receiving the request to lock the tracking apparatus, determining whether a received input corresponds with the secure machine-readable code; and
    providing a control indication to cause an electronic reader in electronic communication with the tracking apparatus to trigger activating the actuating element.

11. The method of claim 10, wherein the electronic tag comprises a passive radio-frequency identification (RFID) tag, and wherein the electronic reader comprises an RFID reader.

12. The method of claim 11, wherein the passive RFID tag comprises an EM4325 integrated circuit (IC) utilizing EPC global Class 1 Generation 2 (EPC C1G2) protocol.

13. The method of claim 10, wherein the securing component comprises an electromagnetic lock or digital lock.

14. A tracking apparatus comprising:

an electronic tag;

a securing component configured to affix the tracking apparatus to an asset, the securing component having an actuating element; and a display element configured to display asset information, wherein the tracking apparatus is configured to, in response to receiving an indication from an electronic reader in electronic communication with the electronic tag, provide a control indication to trigger deactivating the actuating element, wherein the indication from the electronic reader is provided in response to an authentication operation performed via a mobile application executing on a user computing entity, and wherein the authentication operation is initiated by a user scanning a machine-readable code displayed via the display element.

15. The tracking apparatus of claim 14, wherein the electronic tag comprises a passive RFID tag, and wherein the electronic reader comprises an RFID reader.

16. The tracking apparatus of claim 14, wherein the electronic reader comprises the user computing entity.

17. The tracking apparatus of claim 15, wherein the tracking apparatus comprises a power harvesting element configured to store energy obtained from the RFID reader for operations of the tracking apparatus.

18. The tracking apparatus of claim 14, wherein the authentication operation comprises providing a secure machine-readable code, OTP or QR code.

19. The tracking apparatus of claim 14, wherein the securing component comprises an electromagnetic lock or digital lock.

20. The tracking apparatus of claim 14, wherein the asset information comprises passenger information, flight information, or a destination.

* * * * *